Sept. 6, 1955 D. M. ADAMS 2,717,010
TRACTOR SUPPORTED POWER DRIVEN SWINGING CIRCULAR SAW
Filed Aug. 14, 1952 3 Sheets-Sheet 1
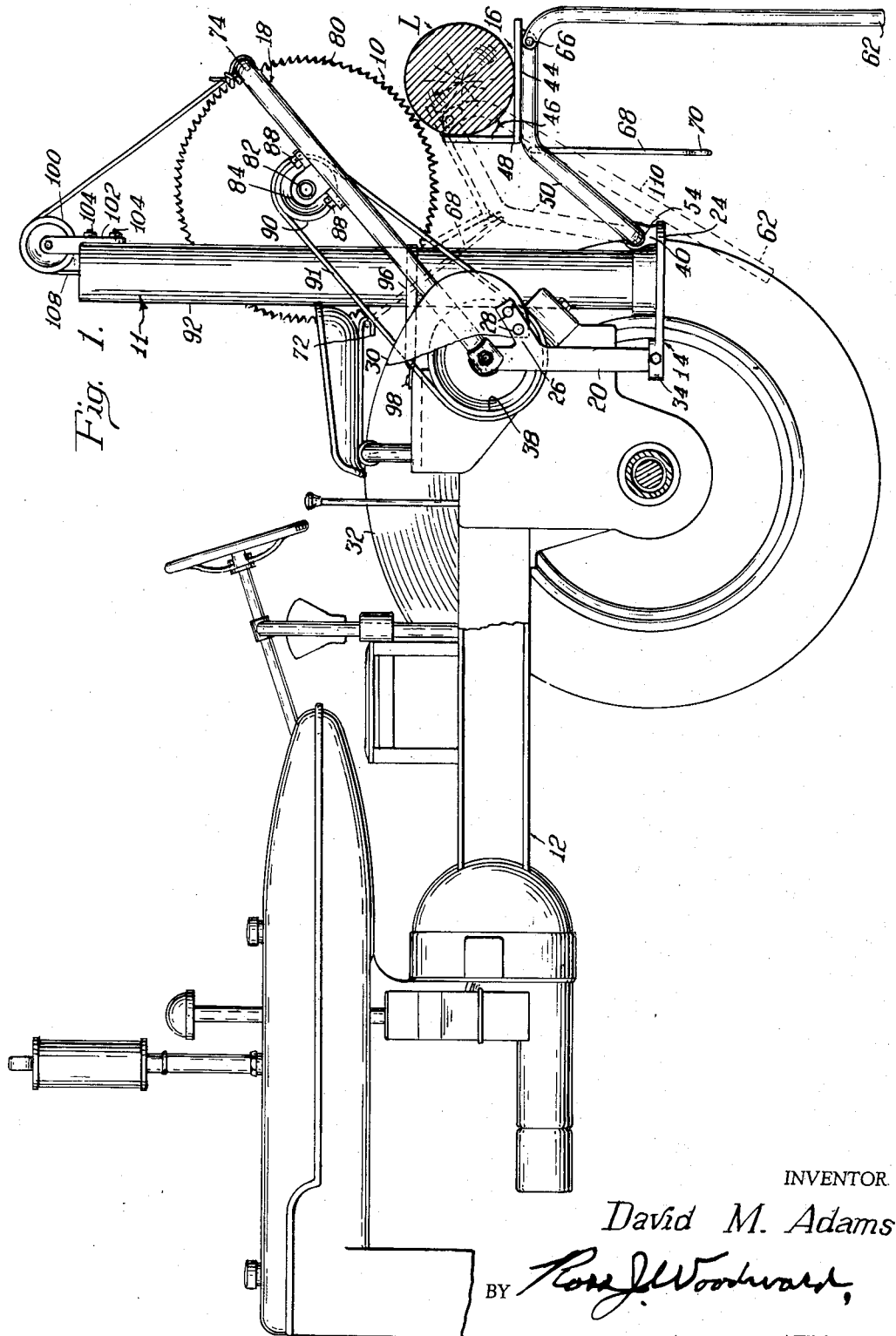
INVENTOR.
David M. Adams
BY
ATTORNEY

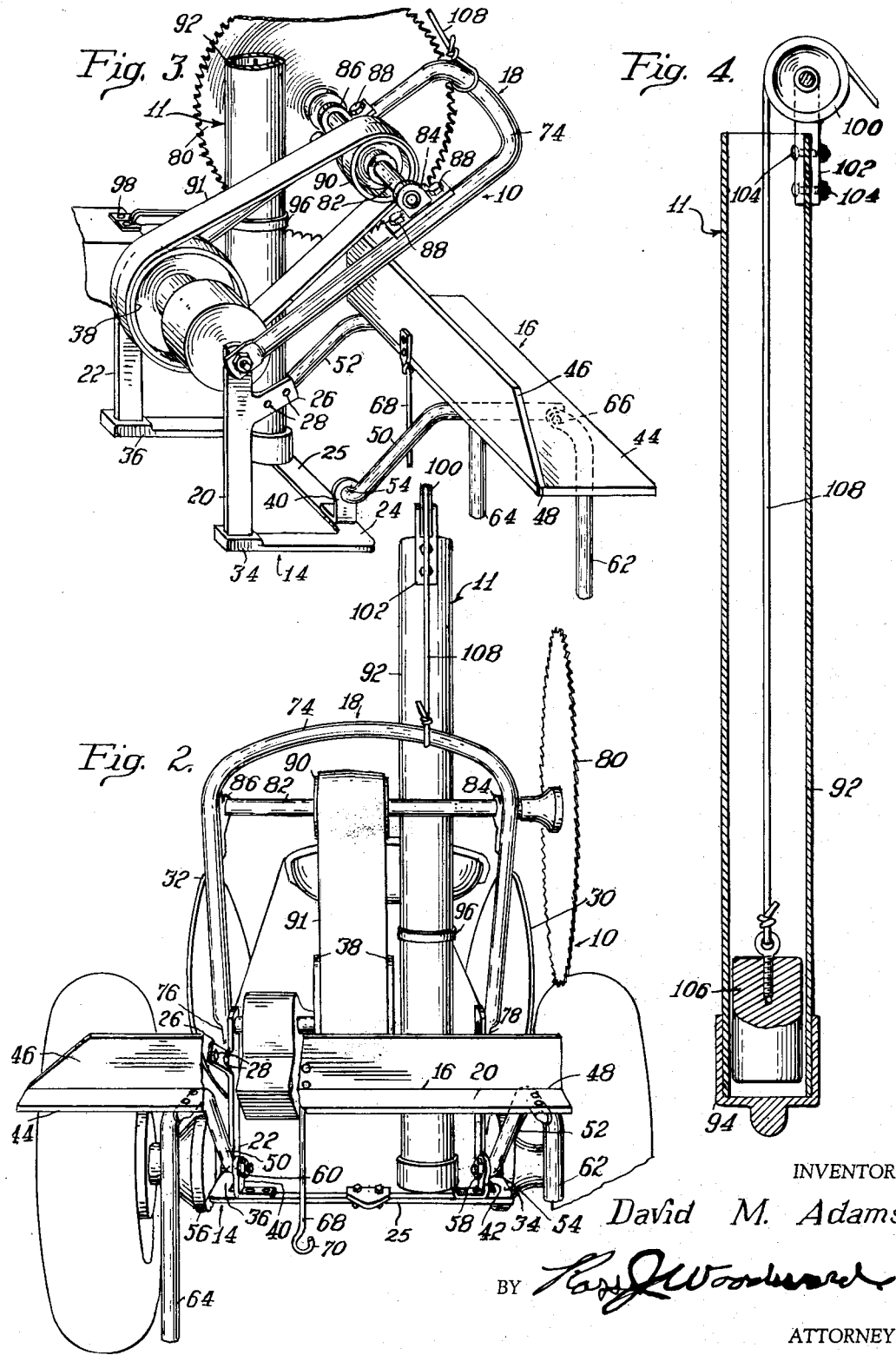

Sept. 6, 1955 D. M. ADAMS 2,717,010
TRACTOR SUPPORTED POWER DRIVEN SWINGING CIRCULAR SAW
Filed Aug. 14, 1952 3 Sheets-Sheet 3

INVENTOR
David M. Adams
BY Ross J. Woodward
ATTORNEY

United States Patent Office 2,717,010
Patented Sept. 6, 1955

2,717,010

TRACTOR SUPPORTED POWER DRIVEN SWINGING CIRCULAR SAW

David M. Adams, Mount Crawford, Va.

Application August 14, 1952, Serial No. 304,383

7 Claims. (Cl. 143—43)

This invention relates to a power driven saw and more particularly to a power operated saw which is adapted to be mounted upon a tractor of the type used upon farms by means of which it is transported from one place to another for use or storage and which saw is driven from the power takeoff of the tractor.

There are saws now in use which are mounted upon a tractor but they have been found unsatisfactory as they are of such construction that they have to be removed from the tractor when not in use as otherwise they are in the way and prevent the tractor from being conveniently used for other purposes.

It is therefore one object of the invention to provide a saw of such construction that it may be conveniently mounted upon a tractor of a conventional construction and its saw carrier and its log supporting frame swung upwardly to a raised position when not in use where it is out of the way and does not interfere with use of the tractor for towing farm implements and also in such position that connection of a drive shaft with a power takeoff of a tractor will not be interfered with.

It has also been found that when power driven saws of present construction are in use it is difficult to move the saw into and out of position for cutting a log and it is therefore another object of the invention to provide a saw structure wherein a yoke carrying a rotary saw may be very easily swung vertically from a raised position to a lowered position and also easily swung upwardly to the inoperative position after a log has been cut through.

Another object of the invention is to provide an improved table for supporting a log to be cut, the table being carried by arms pivoted to a frame adapted to be connected with a tractor and there being supporting legs for the table which are movable from a depending ground-engaging position to a position in which they are disposed close to the arms and are out of the way when the table is swung to its inoperative position.

Another object of the invention is to provide a tractor-carried power driven saw which may be mounted either at the rear end of a tractor or at the front end thereof and which is of a strong construction and not liable to be damaged when subjected to rough usage.

With these and other objects in view the improved tractor-carried power driven saw consists of special features of construction, illustrated in the accompanying drawings, wherein:

Fig. 1 is a side elevation showing a saw of the improved construction mounted at the rear end of a tractor.

Fig. 2 is a rear elevation of the tractor and the power driven saw.

Fig. 3 is a perspective view of the power driven saw.

Fig. 4 is a sectional view of the counterweight and its mounting.

Figure 5:
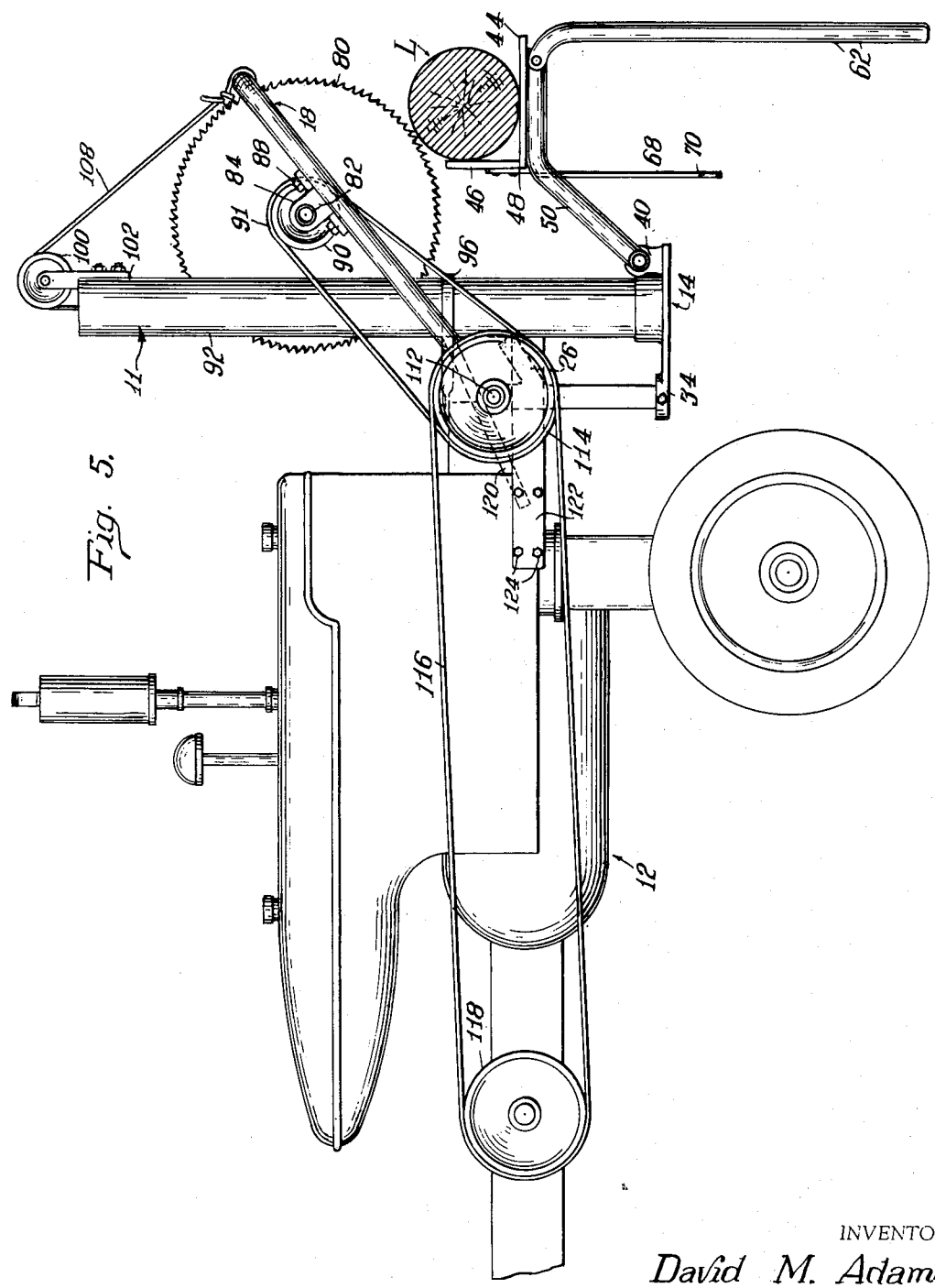
Fig. 5 is a view similar to Figure 1 showing the saw mounted at the front of the tractor.

Referring more particularly to the drawings, wherein like numerals represent like parts throughout, it will be seen that the tractor-mounted power driven saw attachment, designated generally by the numeral 10, is adapted to be mounted on a conventional tractor 12, the tractor illustrated being of the Farmall "A" type. It will be understood that the attachment of the present invention can be adapted for attachments to tractors of other types and makes without involving a departure from the present invention.

The power driven saw attachment 10 is comprised of draw bar means 14 adapted to be fixed or attached to either the front, as in Figure 5, or the rear, as in Figures 1 and 2, of the tractor 12, also supporting table 16 pivotally supported on the draw bar means 14, and a disc saw supporting frame 18, also pivotally supported by the draw bar means 14.

Looking now at Figure 3, the draw bar means 14 will be seen to comprise a pair of anchor bars 20 and 22 and a generally U-shaped flat bar 24. Each anchor bar is made from flat stock and has an angularly extended attachment portion 26 provided with a pair of apertures 28. The anchor bars 22 and 24 are secured to the tractor 12 so as to be vertically depending and the attachment portions 26 can be secured to any convenient portion of the tractors and by any suitable means as rivets, bolts and nuts, or wire. Preferably the attachment portions 26 are secured to the inside faces of the guards 30 and 32. The U-shaped bar 24 is horizontally disposed and has the free ends 34 and 36 of its legs fixedly connected with the lower ends of the anchor bars 20 and 22. The upper ends of the bars 20 and 22 are provided with turned apertures, the axis of which is coincidental with the axis of the conventional power take-off pulley 38 of the tractor, the apertures providing pivotal supports for the disc saw supporting frame 18. The U-shaped bar 24 is provided with a pair of upstanding ears 40 and 42 for pivotal mounting of the log supporting table 16.

The log supporting table 16 includes a pair of elongated plates 44 and 46 substantially right angularly disposed relative to each other and joined along common longitudinal edges at 48. A pair of angulated arms 50 and 52, formed from rod or tube, have portions thereof secured to the underside of the plate 44 in spaced parallel relation. Intermediate portions of the arms 50 and 52 angularly extend downwardly and terminate in right-angularly extending ends 54 and 56. The ends 54 and 56 are journaled in the ears 40 and 42 with nuts 58 and 60, retaining the ends from displacement.

A pair of legs 62 and 64 have their upper ends pivotally connected to the outer ends of the arms 50 and 52, as at 66, the lengths of the legs being such as to engage the surface of the ground to support the table for the logs L at the correct height for sawing. A stiff wire element 68 is swingably mounted at one end on the back side of the plate 46 and has a hooked end 70 adapted to be engaged with the hook 72 on the underside of the seat S of the tractor for retaining the log supporting table in its inoperative position as shown in dotted lines in Figure 1.

The disc saw supporting frame includes a substantially U-shaped bar 74, the free ends of the legs or hooks are flattened and apertured at 76 and 78. Bolts and nuts pivotally connect the flattened ends 76 and 78 to the apertured upper ends of the anchor bars 20 and 22. The bight portion of the bar 74 provides a handle for manipulating the disc saw 80 into and out of cutting position. The shaft 82 to which the saw is fixedly secured is rotatably journaled in the bearings 84 and 86 fixedly mounted on the bar 74 by means of the bolts 88. Between the legs of the bar 74 the shaft 82 has a pulley 90 secured thereto so that a belt 91 can be engaged over the pair of pulleys 38 and 90 to drive the disc saw 80. With the pivotal axis of the supporting frame 18 coincident with that of pulley 38, the saw can be raised and lowered from operative to inoperative positions without affecting the driving connection.

Counterweight means 11, as best seen in Fig. 4, is provided for normally maintaining the disc saw in its raised position. The counterweight means 11 is comprised of an elongated hollow guide or tube 92 closed at the bottom by closure 94 and supported in upstanding relation on the bight portion 25 of the draw bar means 14. An intermediate portion of the tube 92 is fixed relative to the tractor by means of the strap 96, which, as seen best in Figure 1, is rigidly secured to the tractor at 98. The upper end of the tube 92 has a sheave 100 rotatably mounted thereon by means of the bracket 102 bolted at 104. A weight 106 is suitably received in the tube 92 and a cable or cord 108 is attached thereto. The cable is passed over the sheave 100 and is attached to the handle portion or the bar 74.

When it is desired that a log be cut, the hook 70 for the log supporting table is disengaged from the hook 72 on the tractor and the table is downwardly pivoted from the dotted line position of Figure 1 to the full line position with the legs 62 and 64 in supporting position. The log L is then placed on the plate 44 aaginst the plate 46. Next the frame 18 is downwardly pivoted so as to bring the disc saw into cutting relation to the log. When the sawing is completed the frame is pivoted upwardly with the aid of the counterweight means 11. When the log supporting table is in its retracted position the legs 62 and 64 can be tied in position as at 110, by cord or wire so as to leave the bight portion 25 free and unobstructed for use.

Looking now at Figure 5, a modified arrangement is shown. The construction of the attachment is the same as in the above embodiment but the mountings and drives differ. In this form the draw bar means is secured to the front of the tractor to any suitable portion thereof. In the modified embodiment shown, the strap 96 has an extension 120 at each side, and a mounting bar 122 is secured to each of the attachment portions 26. Of course, bolts or other means may be employed for securing the extensions 120 and mounting bars 122 to the front end of the tractor as at 124. A jack shaft 112 is rotatably carried by the upper ends of the anchor bar. A pair of pulleys 114 are secured for rotation with the shaft 112 and one of the pulleys is connected by the belt 116 to the pulley take-off 118 at the side of the tractor. The second pulley is connected with the pulley 90 by the belt 91. Operation of the attachment of this embodiment is, of course, similar to operation of the first described embodiment.

Whether the mounting is to be made at the front or rear of the tractor depends upon the type of tractor and the location of the power take-off pulley. While two embodiments have been shown, other variations and mechanical substitutions can be made without departing from the real spirit and scope of the invention as set forth in the appended claims. Of course, conventional additions may be made to the attachment. For example, a suitable guard can be provided for the disc saw.

Having thus described the invention, what is claimed is:

1. A tractor mounted power driven saw comprising draw bar means for rigid attachment to a tractor, a log supporting table pivotally carried by said draw bar means for vertical tilting movement into and out of log supporting position, a disc saw supporting frame pivotally carried by said draw bar means and rotatably carrying a disc saw for movement vertically toward and away from said table, the pivotal axis of the saw supporting frame being common with the axis of rotation of the power take-off pulley of the tractor, means for interconnecting said disc saw with the power take-off pulley of the tractor for driving the same, a tube mounted vertically upon said draw bar means and open at its top, a sheave rotatably mounted at the top of said tube, a counterweight slidable vertically in said tube, and a cable trained about said sheave and fastened at one end to said counterweight and at its other end to the disc saw supporting frame.

2. A tractor mounted power driven saw comprising draw bar means for rigid attachment to a tractor, a log supporting table pivotally carried by said draw bar means for movement into and out of log supporting position, a disc saw supporting frame pivotally carried by said draw bar means and rotatably carrying a disc saw for movement toward and away from said table, the pivotal axis of the saw supporting frame being common with the axis of rotation of the power take-off pulley of the tractor, means for interconnecting said disc saw with the power take-off pulley of the tractor for driving the same, said draw bar means including a pair of vertical depending anchor bars adapted for attachment to the tractor, a U-shaped bar disposed in a horizontal plane with ends of the legs of the U-shaped bar rigidly secured to the lowermost ends of the depending anchor bars.

3. A tractor mounted power driven saw comprising draw bar means for rigid attachment to a tractor, a log supporting table pivotally carried by said draw bar means for movement into and out of log supporting position, a disc saw supporting frame pivotally carried by said draw bar means and rotatably carrying a disc saw for movement toward and away from said table, the pivotal axis of the saw supporting frame being common with the axis of rotation of the power take-off pulley of the tractor, means for interconnecting said disc saw with the power take-off pulley of the tractor for driving the same, said draw bar means including a pair of vertical depending anchor bars adapted for attachment to the tractor, a U-shaped bar disposed in a horizontal plane with the free ends of the legs of the U-shaped bar rigidly secured to the lowermost ends of the depending anchor bars, and said log supporting table including a pair of plates angularly disposed relative to each other and secured together along common longitudinal edges, and a pair of arms fixedly extending from one of the plates and pivotally mounted on said U-shaped bar.

4. The tractor mounted power driven saw as recited in claim 3 and wherein said log supporting table additionally includes a pair of legs pivotally carried at the underside of the pair of plates and being of such length as to provide ground engaging supports for said table when in use.

5. A tractor mounted power driven saw comprising draw bar means for rigid attachment to a tractor, a log supporting table pivotally carried by said draw bar means for movement into and out of log supporting position, a disc saw supporting frame pivotally carried by said draw bar means and rotatably carrying a disc saw for movement toward and away from said table, the pivotal axis of the saw supporting frame being common with the axis of rotation of the power take-off pulley of the tractor, means for interconnecting said disc saw with the power take-off pulley of the tractor for driving the same, and counterweight means for said disc saw supporting frame including a vertical guide carried by and extending upwardly from said draw bar means, a sheave carried by said guide, a cable attached at one end to said saw supporting frame and trained about said sheave, and a weight attached to the other end of said cable and slidable along said guide and exerting pull upon the cable for normally maintaining the saw and its supporting frame in its inoperative position.

6. A tractor mounted power driven saw comprising draw bar means for rigid attachment to a tractor, a log supporting table pivotally carried by said draw bar means for movement into and out of log supporting position, a disc saw supporting frame pivotally carried by said draw bar means and rotatably carrying a disc saw for movement toward and away from said table, the pivotal axis of the saw supporting frame being common with the axis of rotation of the power take-off pulley of the tractor, means for interconnecting said disc saw with the power take-off pulley of the tractor for driving the same, counterweight means for said disc saw supporting frame normally holding the said frame in its inoperative position, said counterweight means including an elongated hollow tube having its lower end supported by said draw bar means and an intermediate portion thereof fixed relative to the tractor, a sheave rotatably carried by the upper end of said tube, and a cable connected at one end to said disc saw supporting frame and at its other end to a counterweight in said tube with an intermediate portion of the cable engaged over said sheave.

7. A tractor mounted power driven saw comprising draw bar means for rigid attachment to a tractor, a log supporting table pivotally carried by said draw bar means for movement into and out of log supporting position, a disc saw supporting frame pivotally carried by said draw bar means and rotatably carrying a disc saw for vertical movement with the supporting frame toward and away from said table, the pivotal axis of the saw supporting frame being common with the axis of rotation of the power take-off pulley of the tractor, means for interconnecting said disc saw with the power take-off pulley of the tractor for driving the same, said disc saw supporting frame including a U-shaped bar having the free ends of its legs pivotally connected to said draw bar means with the bight portion thereof providing a handle for raising and lowering the saw, a member carried by and extending upwardly above the U-shaped bar, a sheave carried by said member, a cable trained about said sheave and secured at one end to the U-shaped bar, and a weight at the other end of said cable exerting pull upon the cable and normally holding the U-shaped bar in a raised position.

References Cited in the file of this patent

UNITED STATES PATENTS

| Number | Name | Date |
|---|---|---|
| 714,837 | Townsend | Dec. 2, 1902 |
| 1,529,303 | Drucker | Mar. 10, 1925 |
| 1,800,181 | Herider | Apr. 7, 1931 |
| 1,868,770 | See | July 26, 1932 |
| 2,258,828 | Trebert | Oct. 14, 1941 |
| 2,310,152 | Ronning | Feb. 2, 1943 |
| 2,436,504 | Duncklee | Feb. 24, 1948 |
| 2,455,840 | Webb | Dec. 7, 1948 |